B. F. Bee.
Screw Threading Mach.

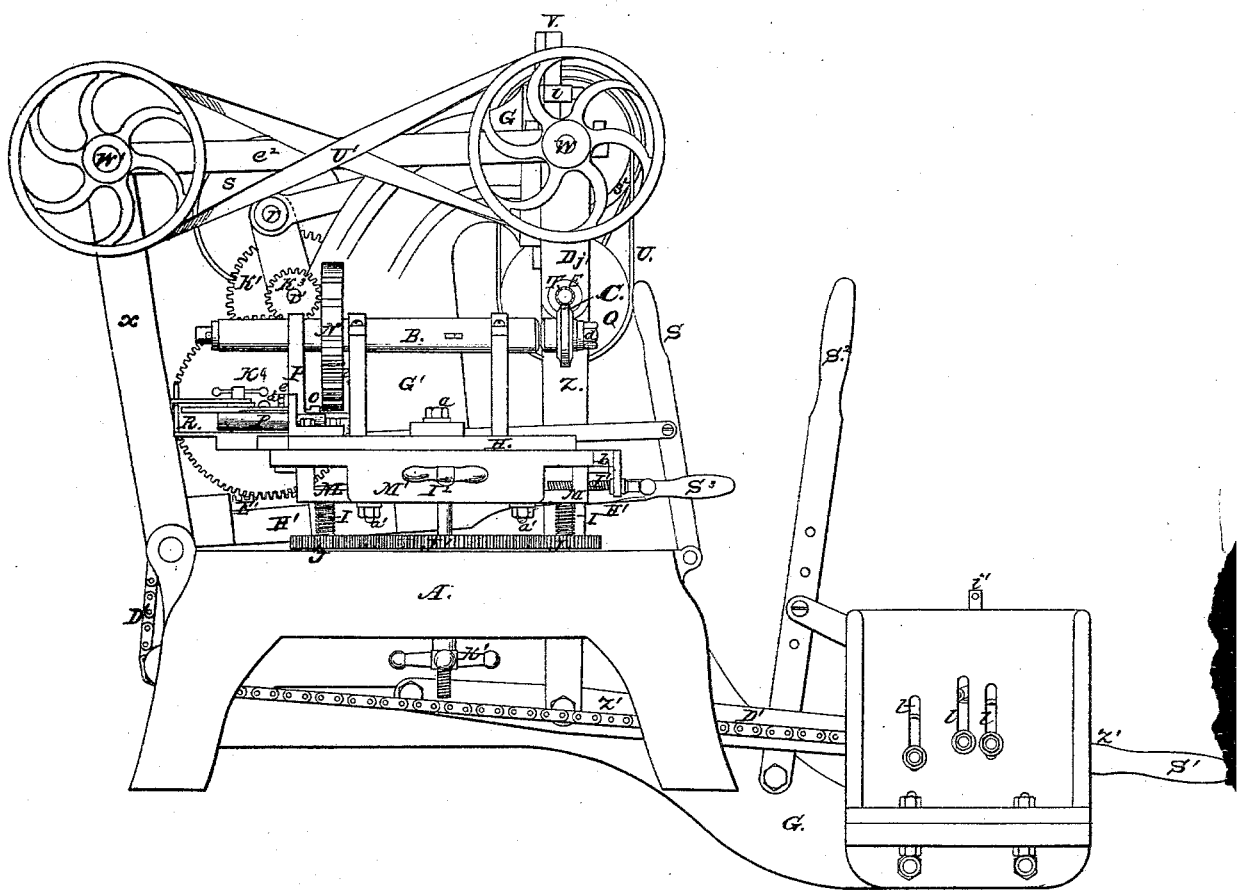

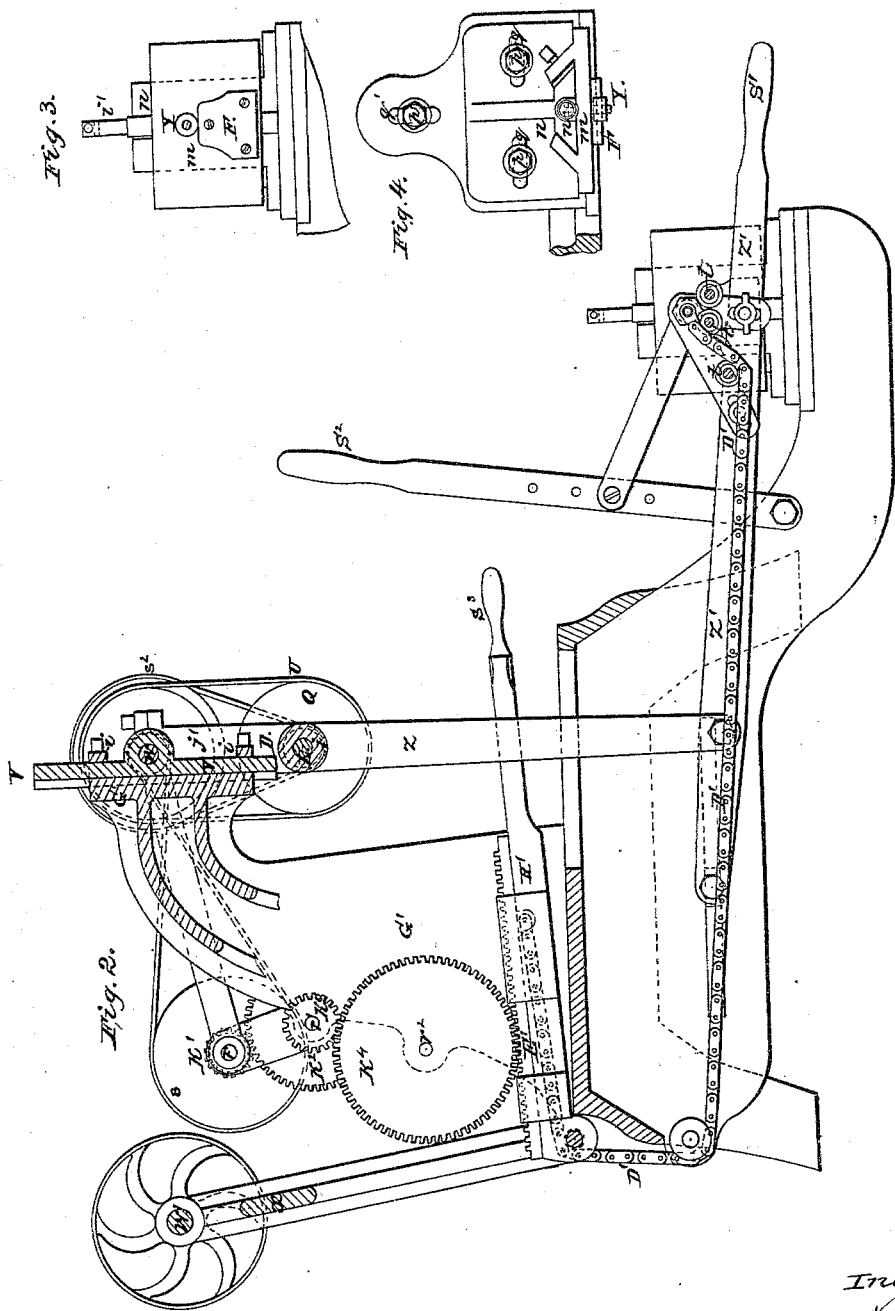

No. 92,565. Patented Jul. 13, 1869.

Witnesses.
W. L. Bennens
John Rathbone Jr.

Inventor.
B. F. Bee
by his attorney
C. S. Renwick

United States Patent Office.

BENJAMIN F. BEE, OF HARWICH, MASSACHUSETTS, ASSIGNOR TO NEW YORK TAP AND DIE COMPANY.

Letters Patent No. 92,565, dated July 13, 1869; antedated July 10, 1869.

IMPROVED MACHINE FOR CUTTING MILLING-TOOLS.

The Schedule referred to in these Letters Patent and making part of the same.

*To all whom it may concern:*

Be it known that I, BENJAMIN F. BEE, of Harwich, in the county of Barnstable, and State of Massachusetts, have invented a new and useful Machine for Cutting Milling-Tools, and performing similar operations; and that the following is a full, clear, and exact description of the same.

Many milling-tools have profiles, which vary materially from arcs of circles, and from straight lines.

Previous to my invention it had been customary to cut the teeth of such tools in a series of separate cuts or approximations to the true lines, which approximations were afterwards finished up by hand.

In operating upon this principle, the same cut is made upon every tooth of the cutter-blank; then the machine is reset, or the tool is changed, or both these operations are performed, and a second approximation is cut upon every tooth of the cutter-blank.

Each of these approximations requires the cutter-blank to be turned once upon its axis, and as in many cases the profile of the milling-cutter differs so much from a true circular arc, or from a straight line, that the several approximations do not produce the required form of tooth, a great deal of hand-work is frequently required in finishing up the cutter after the teeth have been roughed out by a machine.

The object of my invention is to enable each tooth to be completely cut, at one operation, to the true form, by means of a rotating cutter, so that each tooth may be completely cut at one operation, and that the entire blank may be cut by turning it but once upon its axis, instead of as many times as the number of separate approximations.

To this end, the first part of my invention consists of the combination of the following instrumentalities, viz:

First, a mandrel, to hold the cutter-blank which is to be cut.

Second, an index and a pitch-wheel, having as many notches or teeth as there are to be teeth cut in the blank, so that after one groove has been cut, the blank may be set with the position of the next groove, which is to be cut opposite the cutter.

Third, a revolving-cutter arbor, adapted to holding and turning a toothed cutter, by which the blank is cut.

Fourth, a cutter-carriage, for the cutter-arbor, so constructed as to be movable, both radially to the blank-mandrel and longitudinally therewith, so as to carry the cutter in the line of profile of the tooth to be cut.

Fifth, a profile-guide, corresponding in form with the profile of the tooth to be cut.

Sixth, a directing-pin or wheel, to run upon said guide, and direct the cutter-carriage in its movement.

I further combine the instrumentalities composing the first part of my invention with adjusting-mechanism for varying the position of the blank-mandrel, relatively to the cutter-arbor, so as to adapt the machine to the cutting of blanks varying greatly in diameter.

I further combine the instrumentalities composing the first part of my invention with adjusting-screws, or their equivalent, for adjusting the blank-mandrel laterally to the cutter-carriage, so as to adjust the position of the blank to that of the cutter.

I further combine the instrumentalities composing the first part of my invention, with mechanism for turning the blank-mandrel, so that the blank may be turned on its axis, either for the purpose of cutting the teeth helically, or for other purposes.

I further combine the instrumentalities composing the first part of my invention with mechanism for causing the index to move laterally when it is moved longitudinally, so that after each groove is cut in the blank, it may be reset in the position for having the next groove cut, by moving the index longitudinally.

I further combine the first four and last one of the instrumentalities composing the first part of my invention, with a profile-guide, of greater dimensions than the profile of the cutter, whereby the curves of the guide may be made so large and gradual that the directing-pin will traverse them with ease.

I further combine the cutter-arbor, the cutter-carriage, the profile-guide, and the directing-wheel or pin, with mechanism to move the directing-wheel or pin over the guide automatically, at the proper speed, so that the feeding of the cutter along the blank is controlled by the machine, and is not dependent upon the skill of the operator.

I further combine the said directing-instrument with the mechanism for moving it automatically, by means of a flexible connection, such as a chain or strap, guided by pulleys, or an equivalent guide, so as to cause the directing-wheel or pin to run along the profile of the profile-guide.

In order that my invention may be fully understood, I have represented in the accompanying drawings, and will proceed to describe, a machine embodying all my improvements.

Figure 1, of the drawing, represents a side view of the said machine;

Figure 2 represents a vertical longitudinal section of the same;

Figure 3 represents a face view of a profile-guide and the parts adjacent to it;

Figure 4 represents a plan of the stock, to which the profile-guide is secured, and the adjusting-mechanism thereof;

The moving parts of the machine are all connected with a strong frame or bed-plate, A.

The blank-mandrel B, for holding the cutter-blank C, upon which the teeth are to be cut, is connected with one side of this frame, A, and the cutter-carriage D, for the cutter-arbor E, is connected with the other side of this frame, while the profile-guide F is supported in front of it, by a projecting arm, G.

The blank-mandrel B is supported in bearings in a puppet-head, H, which is connected with the frame A by two sets of adjusting-mechanism.

The first of these sets is composed of four screws, I I I I, whose lower ends enter sockets formed in the main frame A, while their upper ends are secured in the bed M, upon which the puppet-head H is supported. These screws pass through nuts resting on the frame A, so that by turning said nuts, the puppet-head, and the mandrel B, carried by it, may be moved toward or from the cutter E, for the purpose of adapting the position of the mandrel to blanks C of different diameters.

Figure 7:
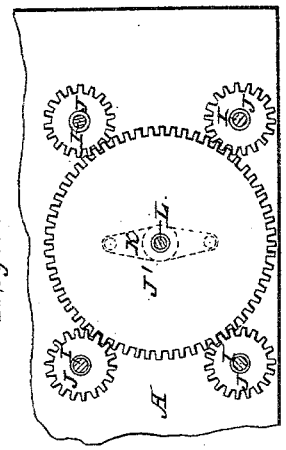
Figure 7 represents a plan of the mechanism for equalizing the adjustment of the blank-mandrel relatively to the cutter-carriage.
Figure 5:
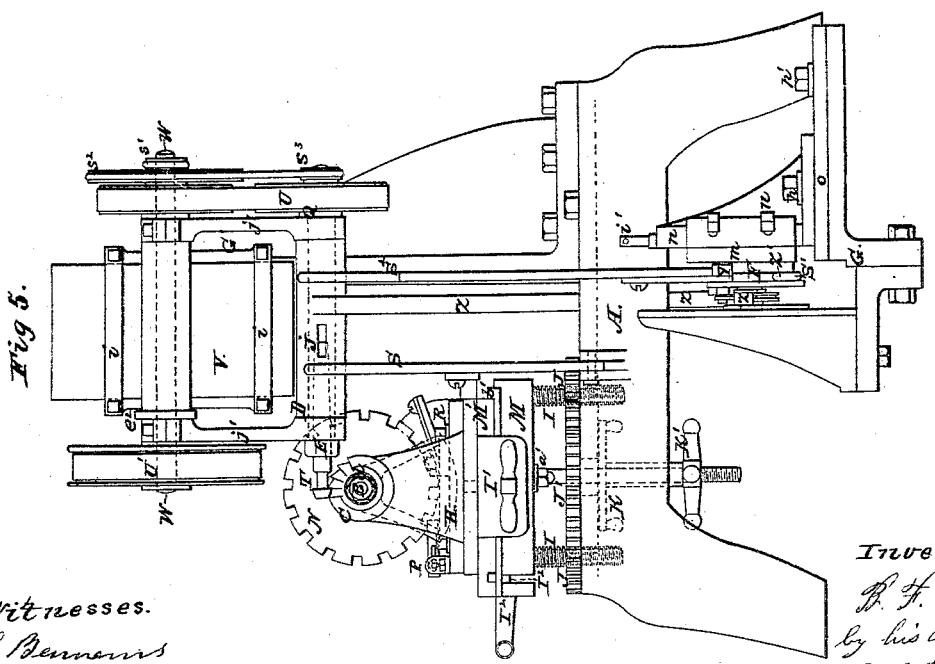
Figure 5 represents a front view of the machine.

In order that the mandrel may be adjusted equably, the four adjusting-screw nuts are formed into four equal cog-wheels, J J J J, which are geared together by a connecting cog-wheel, J', so that the nuts may be all turned simultaneously to the same extent, by turning one of the nut-wheels, or by turning the connecting-wheel, by means of a handle, $K^1$, represented in dotted lines in figs. 5 and 7, which is secured to the lower end of its spindle L.

In order to secure the bed M, when it is adjusted, a screw-clamp, $k'$, is provided, to clamp the connecting-wheel J' in its position after adjustment.

The second set of adjusting-mechanism is composed of two horizontal screws $I^1 I^2$, which operate upon a sliding table, M', that is interposed between the bed M and the puppet-head H, the puppet-head being connected with this sliding table by screws $a\ a$, and the table being mounted upon two pairs of ways $b\ b$, $b'\ b'$, which permit it to move both longitudinally with the mandrel B, and crosswise thereto.

The sliding table is prevented from rising from the bed M by bolts $a^1\ a^1$, and the holes in the base of the puppet-head for the screws $a\ a$, which secure the puppet-head H to the sliding table, are formed in slots $c\ c$, so that the blank-mandrel may be skewed to the cutter-arbor E, for the purpose of cutting inclined or helical teeth upon the blank.

The blank-mandrel B is fitted at one end to receive the blank C upon it, and is provided with a screw-nut, $d$, by which the blank may be clamped fast to the mandrel.

The rear end of the mandrel B is fitted to receive the pitch-wheel N, by which the number and positions of the teeth to be cut upon the blank are determined.

As many of such pitch-wheels may be provided as there are different numbers of teeth to be cut upon cutter-blanks, or an index-plate, fitted with a number of series of notches or holes, should be used in place of the pitch-wheels.

The index O, by which the pitch-wheel and the mandrel are held in their positions during cutting, is connected with the puppet-head, and arranged to engage in any one of the notches of the pitch-wheel that is placed opposite to its point.

In order that the fourth part of my invention may be embodied in the machine represented in the drawings, the index is not directly connected with the puppet-head H, but is connected by means of a swinging frame, P, which is arranged to swing upon the rear end of the mandrel, and is connected with the puppet-head by an adjustable link, $e$, so that the said index may be moved by moving said swinging frame P, so as to vary the position in which the mandrel B and the blank carried by it are held by the pitch-wheel N and index O.

The adjustable link $e$, in the machine represented, is constructed to be secured by a clamp-screw, $a^2$, but it may be secured by a feed-screw, so that by turning said screw, the swinging frame, and the index mounted upon it, may be moved progressively while the cutter is operating upon the blank, so as to produce helical teeth thereon.

In order that the index O may be used for the purpose of turning the mandrel N and the blank upon it, the distance between successive teeth, the index O is constructed to slide upon its support, and is fitted with an inclined guide, $f$, which, when the index is moved forward, bears against the inner side of the adjacent leg $g$, of the swinging frame P, and compels the index to move laterally and turn the pitch-wheel, with the notch of which the index-point is engaged.

The inclined guide is made adjustable by hinging its front end to the index, and by connecting its rear end with the index by an adjustable link, $e^1$, so that the inclination of the inclined guide may be varied to cause the index to move laterally greater or less distances, according to the pitch of the pitch-wheel used.

In order that the index may be conveniently moved by the attendant standing at the front of the machine, the rear end of the index is connected with a slide, R, which is connected with a lever-handle, S, to which the attendant may apply his hand.

It is expedient to apply a spring or a weight to move the index laterally, in the opposite direction to that in which it is caused to move by the inclined guide $f$, so that the index may be so moved when it is disengaged from the notch of the pitch-wheel, by moving the index backward, and may be thereby placed in position to engage with the next notch of the pitch-wheel when the index is drawn partially forward.

Figure 6:
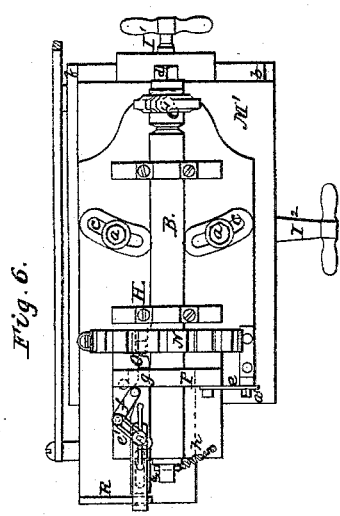
Figure 6 represents a plan of the blank-mandrel and its connections.

Such a spring is represented in red lines in the drawing, at $h$, fig. 6.

The arbor E, for revolving the cutter T, is constructed to revolve in a tubular bearing, $j$, of the cutter-carriage D. It has a socket formed in its front end, to receive the shank of the cutter T, and it is fitted, at its rear end, with a pulley, Q, to which the belt U is applied, by which the requisite rotary motion is imparted.

The cutter-carriage, in this example, is formed by the tubular box or bearing $j$ and the arms $j'\ j'$. The latter connect it with a sliding stock, V, which is constructed to slide upon a supporting-arm, G', toward and from the axial line of the blank-mandrel B, or, in other words, in the direction of a radius thereof, the back of the stock being, for this purpose, fitted with feathers, that slide up and down in grooves in the head of the supporting-arm G', that connects the cutter-carriage with the main frame A, and being held in its position by cross-bars $i\ i$.

In order that the cutter-carriage may also move in the direction of the length of the blank-mandrel B, the upper ends of the arms $j'\ j'$ are connected with the sliding stock V, by means of a shaft, W, upon which the carriage may be swung to and fro, so as to move the cutter in the required direction.

In order that the movement of the cutter-carriage may not effect the driving of the cutter, the belt U, that imparts motion to the cutter, is applied to a pulley, Q', upon this countershaft W at the axis of the swinging movement, and this countershaft is driven by a belt, U', proceeding from the driving-shaft W', which is mounted upon a swinging frame, X, that is connected with the countershaft by a link, $e^2$, so as to preserve the relationship of the two shafts W W', that are connected by the belt U', notwithstanding the change in the position of the countershaft W by the movement of the cutter-carriage.

The driving-shaft is provided with a loose pulley and with a fast pulley, in the usual manner, to receive the driving-belt from the shafting of the establishment, and as the frame X swings horizontally but a very small distance, the driving-belt will accommodate itself to this movement if the machine be set with its driving-shaft W beneath the shaft from which the power is taken.

The cutter-carriage is connected with the directing-wheel Y, that traverses the profile-guide F, by means of a lever-arm, Z, and by a lever, Z'; and, as the movement of the cutter T, relatively to the directing-wheel Y, is greatly reduced by reason of the leverage of the lever-arm Z and lever Z', a profile-guide, F, may be employed that is much larger than the actual profile of the blank to be cut; hence the curves of the profile may be less abrupt than those of the blank, and the directing-wheel Y may be made to traverse them readily, although it be of considerably greater diameter than the cutter T.

The profile-guide F is secured to a slide-plate, m, which is constructed to slide upon a guide-stock, n, so that the profile-guide may be adjusted vertically, a screw, i', being provided for this purpose.

The guide-stock n also is connected with the projecting arm of the frame through the intervention of a sliding plate, o, and two sets of clamp-screws, p p', whose stems pass through slots, q q', so that the profile-guide may be adjusted horizontally to the desired position in the machine.

The lever-arm Z' is provided with a handle, S¹, by which it may be held in a vertical direction, so as to maintain the directing-wheel Y in contact with the profile-guide, and a handle, S², is provided, to move or hold the said directing-wheel in horizontal directions relatively to the said guide. If the hands of the operator be applied to these handles while the cutter T is revolving, and a blank is upon the mandrel B, the cutter may be moved by hand, and may also be directed during such movement by the contact of the directing-wheel Y with the profile-guide F, to cut a tooth corresponding in profile with that of the said guide, but reduced in size, by reason of the leverage of the connection between the cutter and the directing-wheel Y.

In order that the cutter T, while cutting, may be fed along the blank automatically, the directing-wheel Y is connected by a chain, D', or by a band, with a feed-rack, E', that is arranged to slide upon a lever-stock, H'; and gearing is provided to move the feed-rack, so as to pull the directing-wheel over the profile-guide, and to change the position of the cutter with the desired speed.

The gearing consists of a train of wheels, K¹ K² K³ K⁴, mounted upon shafts, r r¹ r², supported by the arm G'; the last, K⁴, of the wheels, being in a position to engage with the rack E', when the latter is raised for the purpose by means of the lever-stock H, while the shaft r, of the first, K¹, of the wheels, is fitted with a belt-pulley, s, which is driven by a pulley, s¹, that revolves upon a stud projecting from the end of the countershaft W.

This latter pulley, s¹, has a second pulley, s², made fast to its hub, and connected by a belt with a pulley, s³, that is secured to the end of the cutter-arbor.

Hence the directing-wheel Y is combined with the cutter, through the rack and gearing above described, and the feed takes place in proportion to the speed with which the cutter is driven, without depending upon the skill or judgment of the attendant.

When automatic feeding is to be effected, the teeth of the rack E' are engaged with those of the wheel K⁴, by raising the lever-stock H' by means of its handle S³, and when one groove of the blank O has been cut, the rack is disengaged, (by lowering the lever-stock,) so that the directing-wheel Y and cutter T may be moved back rapidly (by applying the hands to the handles S¹ S²) to the positions of commencing for the next cut.

In order that the directing-wheel Y may traverse the profile of the guide with ease when so moved automatically, pulley-wheels, t t t, are provided, to maintain the connecting-chain D' approximately in the form of a profile-guide, so that the directing-wheel is drawn along the profile of the guide, instead of being pressed directly against it.

In order to fit the machine for feeding automatically when cutting blanks varying materially in profile, the arbors of the pulleys t t t, which hold the connecting-belt or chain D', are made adjustable, by fitting their shanks with screw-threads and nuts, and by applying them to slots, l, in their support, so as to permit a great scope of adjustment, to suit profile-guides of different forms and dimensions.

When a blank is to be cut with the machine, the first operation required is to procure a profile-guide corresponding in form with the profile of the blank, but larger in proportion to the leverage of the connection between the directing-wheel Y and the cutter T.

Such a guide may be laid out geometrically, or may be drawn in the machine, by putting the blank on the mandrel B in the position in which it is to be cut, applying a smooth pin to the mandrel, drawing this pin (by the handles S¹ S²) over the blank, and by marking the profile-line described by the rim of the directing-wheel Y upon a thin piece of material placed against the face of the guide-stock m for the purpose; the profile-guide may then be shaped according to the profile-line thus drawn.

When the profile-guide is put in its place, and adjusted, the teeth may be cut rapidly upon the blank by the operation of the machine, as the cutter is guided directly in the path in which the groove is to be cut by it for forming the back of one tooth and the front of the adjacent tooth.

After each passage of the cutter, it is removed from the blank, by moving one or both of the handles S¹ S², and the blank is turned to the position for the next groove by drawing the index O forward, by means of the handle S, after which the index should be moved backward (by the same handle) sufficiently to disengage it from the notch of the pitch-wheel on which it has acted, and should be again drawn partially forward, to re-engage it with the succeeding notch.

When the curves of the profile of the blank to be cut are not too abrupt, a wheel may be used as the directing-instrument. When the curves are very small, a smooth pin should be used in place of the wheel.

Having thus described a machine embodying all parts of my invention, I declare that I do not claim separately the members of which my combinations are composed; nor do I limit my invention to the precise form and construction of such members, as the machine may be greatly modified, without ceasing to embody my invention, and some parts of the invention may be used without others.

What I claim as my invention, and desire to secure by Letters Patent, are the following combinations, viz:

1. The combination, in one machine, of the following instrumentalities, viz, the mandrel, to hold the blank, the pitch-wheel and index, the revolving cutter-arbor, the cutter-carriage, the profile-guide, and the directing-instrument, the whole constructed to operate substantially as before set forth.

2. Also, the combination of the above-specified combination with adjusting-mechanism for varying the position of the mandrel relatively to the cutter-arbor, substantially as before set forth, the whole constructed to operate substantially as described.

3. Also, the combination of the combination recited in the first claim with adjusting-screws, to vary the position of the mandrel laterally to the cutter-carriage, substantially as before set forth, the whole being constructed to operate substantially as described.

4. Also, the combination of the combination recited in the first claim with mechanism for turning the blank-mandrel, substantially as before set forth, the whole constructed to operate substantially as described.

5. Also, the combination of the combination recited in the first claim with mechanism for causing the index to move laterally when it is moved longitudinally, substantially as before set forth, the whole constructed to operate substantially as described.

6. Also, the combination of the said blank-mandrel, pitch-wheel, and index, revolving cutter-arbor, cutter-carriage, and directing-instrument, with a profile-guide of larger dimensions than the profile of the blank, the whole constructed to operate substantially as before set forth.

7. Also, the combination of the said cutter-arbor, cutter-carriage, profile-guide, and directing-instrument with mechanism to move the directing-instrument automatically over the said guide, the whole constructed to operate substantially as before set forth.

8. Also, the combination of the directing-instrument and the mechanism for moving it automatically, by means of a flexible connection guided by pulleys, the whole constructed to operate substantially as before set forth.

BENJAMIN F. BEE.

Witnesses:
   WM. H. UNDERWOOD,
   J. UNDERWOOD.